(12) United States Patent
Shim et al.

(10) Patent No.: US 10,892,926 B2
(45) Date of Patent: Jan. 12, 2021

(54) METHOD AND DEVICE FOR TRANSMITTING SIGNAL BY SWITCHING PHASE IN MOBILE COMMUNICATION SYSTEM

(71) Applicant: Samsung Electronics Co., Ltd., Suwon-si (KR)

(72) Inventors: Seijoon Shim, Seoul (KR); Hayoung Yang, Yongin-si (KR); Chongdon Kim, Seongnam-si (KR); Chanho Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/325,633

(22) PCT Filed: Aug. 18, 2017

(86) PCT No.: PCT/KR2017/009000
§ 371 (c)(1),
(2) Date: Feb. 14, 2019

(87) PCT Pub. No.: WO2018/034530
PCT Pub. Date: Feb. 22, 2018

(65) Prior Publication Data
US 2019/0215204 A1 Jul. 11, 2019

(30) Foreign Application Priority Data
Aug. 18, 2016 (KR) .......... 10-2016-0104789

(51) Int. Cl.
*H04L 27/20* (2006.01)
*H04L 5/00* (2006.01)
(Continued)

(52) U.S. Cl.
CPC ....... *H04L 27/2003* (2013.01); *H04B 7/0671* (2013.01); *H04B 7/0682* (2013.01);
(Continued)

(58) Field of Classification Search
CPC ..... H04L 27/2003; H04L 5/0057; H04L 5/14; H04L 27/2657; H04L 27/2675
See application file for complete search history.

(56) References Cited

U.S. PATENT DOCUMENTS 7,149,266 B1 * 12/2006 Imamura ............ H04L 27/2657
 375/355
2008/0039030 A1 * 2/2008 Khan .................. H04B 7/0617
 455/101
(Continued)

FOREIGN PATENT DOCUMENTS

EP 1 887 713 A2 2/2008
EP 3 002 887 A1 4/2016

OTHER PUBLICATIONS

Toshihiro Iima et al: "Performance of delay diversity with subcarrier-based signal phase rotation in OFDM system", Communication Systems (ICCS), 2010 IEEE International Conference on, IEEE, Piscataway, NJ, USA, Nov. 17, 2010 (Nov. 17, 2010), pp. 436-440, XP031847884.
(Continued)

*Primary Examiner* — Janice N Tieu
(74) *Attorney, Agent, or Firm* — Jefferson IP Law, LLP

(57) ABSTRACT

Disclosed are a method and a device for differently applying phase rotations for each antenna by dividing a frequency band in order to solve a problem in which reception performance deteriorates in a specific subcarrier when the correlation between antennas is high. According to the present invention, a method by which a transmitter transmits a signal comprises the steps of: estimating the transmission correlation between respective transmission paths; calculating a
(Continued)

phase rotation value to be applied to a transmission signal on the basis of the estimated transmission correlation; applying a phase rotation in accordance with the phase rotation value to the transmission signal; and transmitting the transmission signal.

14 Claims, 11 Drawing Sheets

(51) Int. Cl.
| | |
|---|---|
| H04B 17/12 | (2015.01) |
| H04B 7/06 | (2006.01) |
| H04L 25/02 | (2006.01) |
| H04B 17/309 | (2015.01) |
| H04L 5/14 | (2006.01) |
| H04L 27/26 | (2006.01) |

(52) U.S. Cl.
CPC .......... *H04B 17/12* (2015.01); *H04B 17/309* (2015.01); *H04L 5/006* (2013.01); *H04L 5/0048* (2013.01); *H04L 5/0057* (2013.01); *H04L 5/14* (2013.01); *H04L 25/02* (2013.01); *H04L 27/26* (2013.01); *H04L 27/2657* (2013.01); *H04L 27/2675* (2013.01); *H04L 5/001* (2013.01); *H04L 5/0023* (2013.01)

(56) References Cited

U.S. PATENT DOCUMENTS

| | | | |
|---|---|---|---|
| 2010/0208779 A1 | 8/2010 | Park et al. | |
| 2010/0304695 A1* | 12/2010 | Persson | G01R 25/08 |
| | | | 455/115.1 |
| 2012/0236961 A1* | 9/2012 | Lee | H04B 7/028 |
| | | | 375/295 |
| 2013/0100997 A1 | 4/2013 | Wang et al. | |
| 2013/0113653 A1 | 5/2013 | Kishigami et al. | |
| 2013/0195070 A1* | 8/2013 | Bashar | H04W 4/70 |
| | | | 370/330 |
| 2013/0250789 A1 | 9/2013 | McWilliams et al. | |
| 2014/0062813 A1* | 3/2014 | Alrabadi | H01Q 5/35 |
| | | | 343/745 |
| 2015/0009951 A1 | 1/2015 | Josiam et al. | |
| 2015/0270883 A1 | 9/2015 | Rached et al. | |
| 2017/0374638 A1* | 12/2017 | Han | H04J 11/00 |

OTHER PUBLICATIONS

European Office Action dated Jun. 6, 2019; Reference#: P21971WOEP; Application/Patent#: 17841712.7-1219/3487135 PCT/KR2017009000.
Multicarrier delay diversity modulation for MIMO systems, Jun Tan, Student Member, IEEE and Gordon L. Stüber, Fellow, IEEE, Sep. 2004, p. 1756-1763.
Cyclic delay diversity with bit-interleaved coded modulation in orthogonal frequency division multiple access, Bauch, Senior Member, IEEE, and Javed Shamim Malik, Aug. 2006, p. 2092-2100.

* cited by examiner

METHOD AND DEVICE FOR TRANSMITTING SIGNAL BY SWITCHING PHASE IN MOBILE COMMUNICATION SYSTEM

CROSS-REFERENCE TO RELATED APPLICATION(S)

This application is a U.S. National Stage application under 35 U.S.C. § 371 of an International application number PCT/KR2017/009000, filed on Aug. 18, 2017 which is based claimed priority of a Korean patent application No. 10-2016-0104789, filed on Aug. 18, 2016, in the Korean Intellectual Property Office the disclosure of which is incorporated herein by reference in its entirety.

TECHNICAL FIELD

The present invention relates to a phase switching-based signal transmission method and device and, in particular, to a method and device for transmitting a signal by switching between frequency band-specific phases.

BACKGROUND ART

Recently, discussions are underway to employ a frequency utilization improvement technology such as carrier aggregation, a new service provision technology such as machine type communication (MTC), and a spectral efficiency enhancement technology as new standard technologies for the long term evolution (LTE) standard developed by the 3rd generation partnership project (3GPP). Among them, the spectral efficiency enhancement technology is mainly represented by a multiple-input multiple output (MIMO) technology, and various MIMO schemes are adopted in the LTE standard. More recently, the LTE release 12 (Rel-12) standard specifies a method for improving the spectral efficiency by adding a feedback mode including a subband channel quality indicator (hereinafter, referred to as subband CQI) and a subband precoding matrix index (hereinafter, referred to as PMI). Meanwhile, recent topics for the 5G communication standard under discussion include the introduction of millimeter wave (mmWave) communication, which requires a method for measuring correlations antennas to reduce the effect of channel selectivity so as to transmit data efficiently using the mmWave; studies are being conducted for reflecting the measurement results to operations of a base station.

In separation from the supportability in the standard, it may be possible to consider a method for implementing the base station to improve the spectral efficiency, and a cyclic delay diversity (CDD) is a representative one of such methods. The CDD is named in the sense that a frequency-domain phase on a subcarrier changes at a predetermined time-domain delay, and this technology similar to the virtual antenna mapping (VAM) defined for the wideband code division multiple access (WCDMA) as one of the 3rd generation (3D) communication standards.

For the legacy CDD or VAM technology, researches have been conducted on a method for mapping antennas according to the predetermined delay or phase. Although a technology for achieving a long delay diversity between transmit antenna paths is employed under the name of large delay CDD or transmission mode 3 in the LTE standard, this technology is also limited in that a predetermined delay is applied to OFDM subcarriers.

DISCLOSURE OF INVENTION

Technical Problem

However, a high correlation between the antennas is likely to cause frequency nulling on a specific subcarrier, resulting in degradation of a signal reception performance. In order to solve this problem, there is a need of a method for applying phase switching per antenna by dividing the frequency band.

Solution to Problem

In accordance with an aspect of the present invention, a signal transmission method of a transmitter includes estimating a transmit correlation between transmission paths, calculating phase rotation values to be applied to a transmission signal based on the estimated transmit correlation, applying phase rotation to the transmission signal according to the phase rotation values, and transmitting the transmission signal.

Preferably, the phase rotation values are calculated by a small unit constituting a frequency band based on channel state; preferably, the method further includes receiving, if a time division duplex (TDD) system is applied, a sounding reference signal (SRS), the phase rotation values being calculated based on channel state information estimated based on the SRS; preferably, the method further includes receiving, if a frequency division duplex (FDD) system is applied, channel state information transmitted by a receiver, the phase rotation values being calculated based on the channel state information.

In accordance with another aspect of the present invention, a transmitter for transmitting a signal includes a transceiver configured to transmit and receive signals to and from a receiver and a controller configured to control to estimate a transmit correlation between transmission paths, calculate phase rotation values to be applied to a transmission signal based on the estimated transmit correlation, apply phase rotation to the transmission signal according to the phase rotation values, and transmit the transmission signal.

Preferably, the phase rotation values are calculated by a small unit constituting a frequency band based on channel state; preferably, the controller is configured to control to receive, if a time division duplex (TDD) system is applied, a sounding reference signal (SRS), the phase rotation values being calculated based on channel state information estimated based on the SRS; preferably, the controller is configured to control to receive, if a frequency division duplex (FDD) system is applied, channel state information transmitted by a receiver, the phase rotation values being calculated based on the channel state information.

Advantageous Effects of Invention

The signal transmission method of the present invention is advantageous in terms of improving a signal transmission efficiency by applying a different phase rotation to each resource block.

MODE FOR THE INVENTION

Figure 1A:
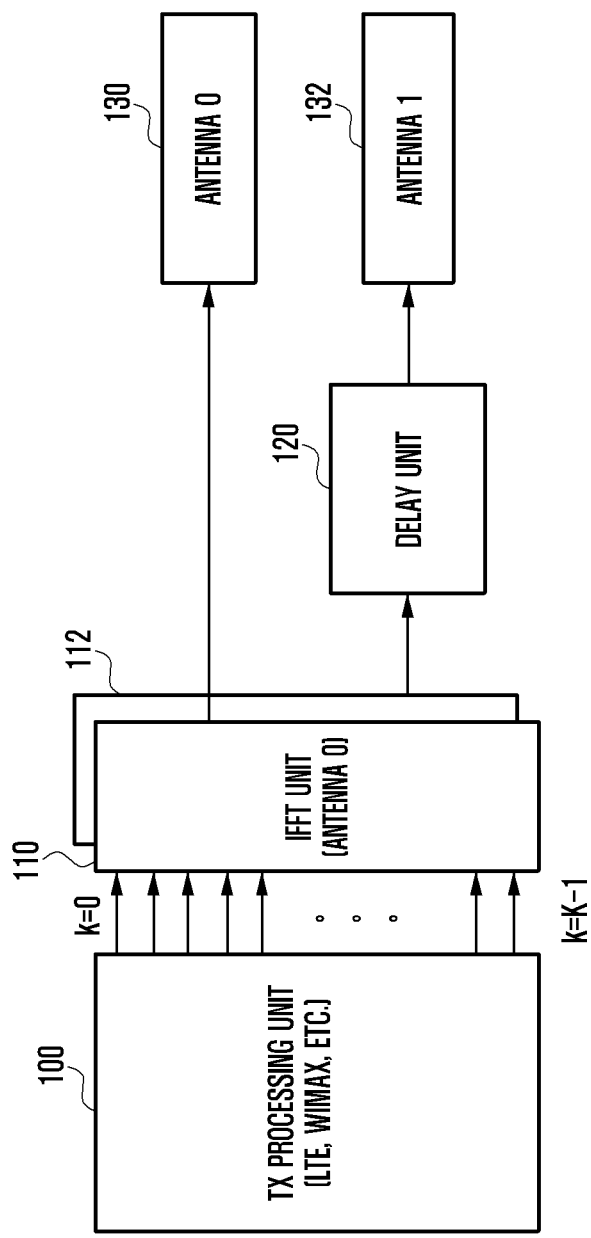
FIG. 1A is a diagram illustrating a device configured to implement a CDD technology.

Exemplary embodiments of the present invention are described in detail with reference to the accompanying drawings. Detailed description of well-known functions and structures incorporated herein may be omitted to avoid obscuring the subject matter of the present invention. Further, the following terms are defined in consideration of the functionality in the present invention, and may vary according to the intention of a user or an operator, usage, etc. Therefore, the definition should be made on the basis of the overall content of the present specification.

It will be understood by those skilled in the art that the present invention embodied in various embodiments can be applied even to other communication systems having a similar technical background and channel format, with a slight modification, without departing from the spirit and scope of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present invention, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionalities of the components and modules may be combined into fewer components and modules or further separated into more components and modules. In addition, the components and modules may be implemented such that they execute one or more CPUs in a device or a secure multimedia card.

FIG. 1A is a diagram illustrating a device configured to implement a CDD technology.

In reference to FIG. 1A, an OFDM-based device configured to implement the CDD technology includes a TX processing unit 100, inverse fast Fourier transform (IFFT) units 100 and 112, a delay unit 120, and antennas 130 and 132. In the drawing, k denotes a subcarrier index, the Tx processing unit processes signals on K subcarriers and outputs the processed signals to the IFFT units, the IFFT unit 110 for antenna 0 performs IFFT on the input signals and maps the IFFT'ed signal to antenna 0 130, and the IFFT unit 112 for antenna 1 performs IFFT on the input signals, delays the IFFT'ed signal via the delay unit 120, and maps the delayed signal to antenna 1 132.

Figure 1B:
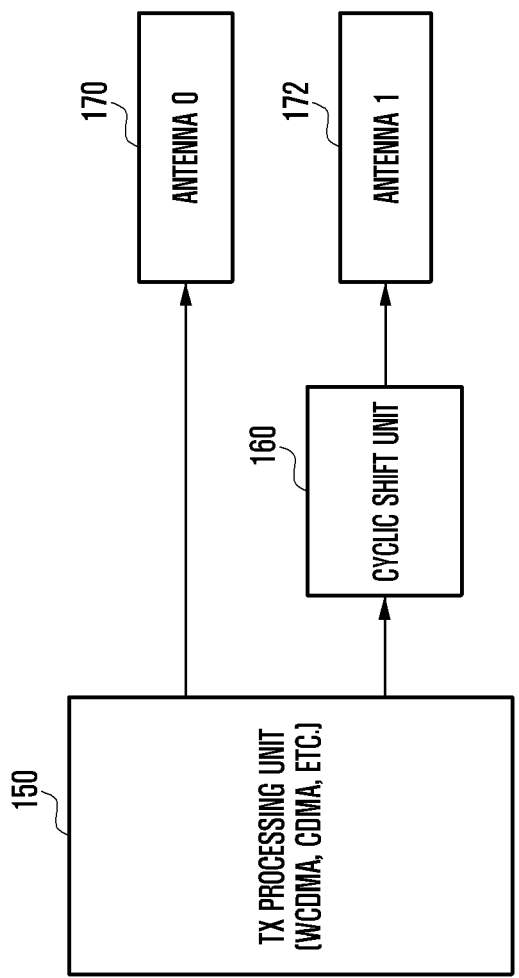
FIG. 1B is a diagram illustrating a device configured to implement a VAM technology.

FIG. 1B is a diagram illustrating a device configured to implement a VAM technology.

In reference to FIG. 1B, a CDMA-based device configured to implement the VAM technology includes a TX processing unit 150, a cyclic shift unit 160, and antennas 170 and 172. After being processed by the TX processing unit, the signal mapped to antenna 0 170 is transferred to the antenna 0 with no phase rotation, and the signal mapped to antenna 1 171 is transferred to the antenna 1 after being phase-rotated.

As described above, the CDD and VAM are technologies for mapping a signal to the antenna after delaying the signal in time or rotating the signal in phase. That is, both the CDD and VAM are technologies for performing antenna mapping after shifting the phase of a signal (in OFDM systems such as LTE, the signal shifted in phase in the frequency domain as a result of being delayed in time in the time domain) such that the signals transmitted via different antennas experience different channel phases.

Figure 2:
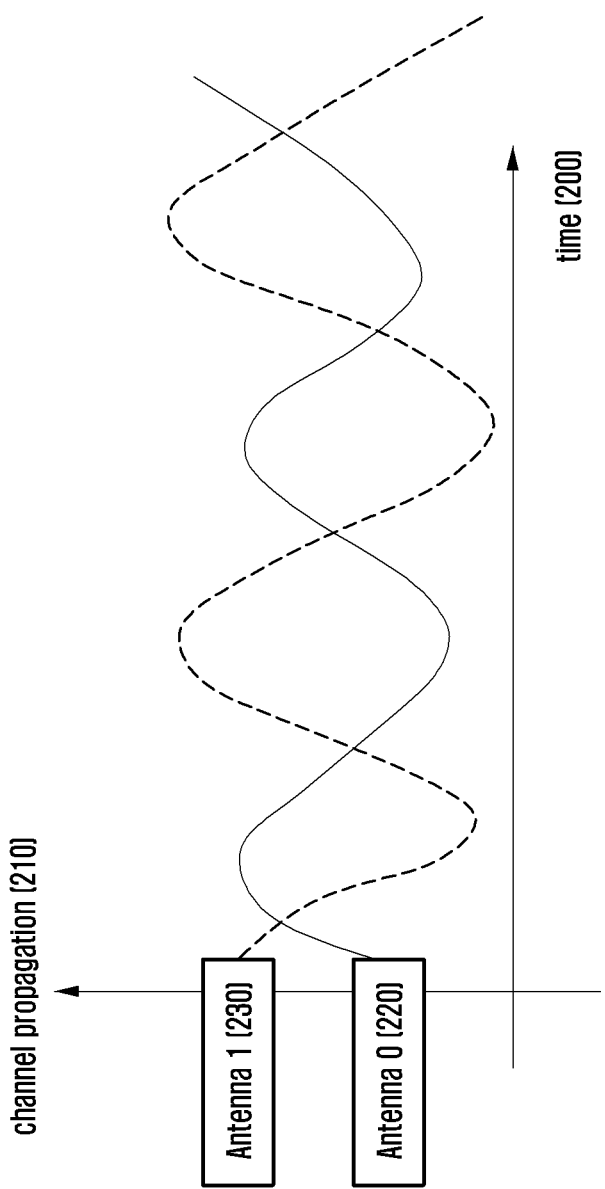
FIG. 2 is a diagram for explaining time-varying channels experienced by signals transmitted via different antennas.

FIG. 2 is a diagram for explaining time-varying channels experienced by signals transmitted via different antennas.

In reference to FIG. 2, as time 200 goes by, the signals transmitted via antenna 0 220 and antenna 2 230 vary in channel propagation 210. Because the transmission channels differ between antennas, a receiver may achieve transmit diversity gain for the antennas.

As described above, the CDD and VAM are technologies for achieving a channel diversity in accordance with channel variation between antennas, even the multi-subcarrier technology such as OFDMA has evolved in a way of applying a predetermined phase rotation to all subcarriers.

In the case of allocating multiple subbands produced by grouping a plurality of subcarriers in an OFDMA-based system such as LTE, it may be possible to use the characteristic in that each user experiences a different channel. In particular, considering that the studies are being conducted on a feedback mode for transmitting per-subband CQIs and per-subband PMI to improve resource utilization efficiency through per-subband resource management in the LTE Rel-12, it is necessary to develop an algorithm for applying a phase dynamically per subband.

Figure 3:
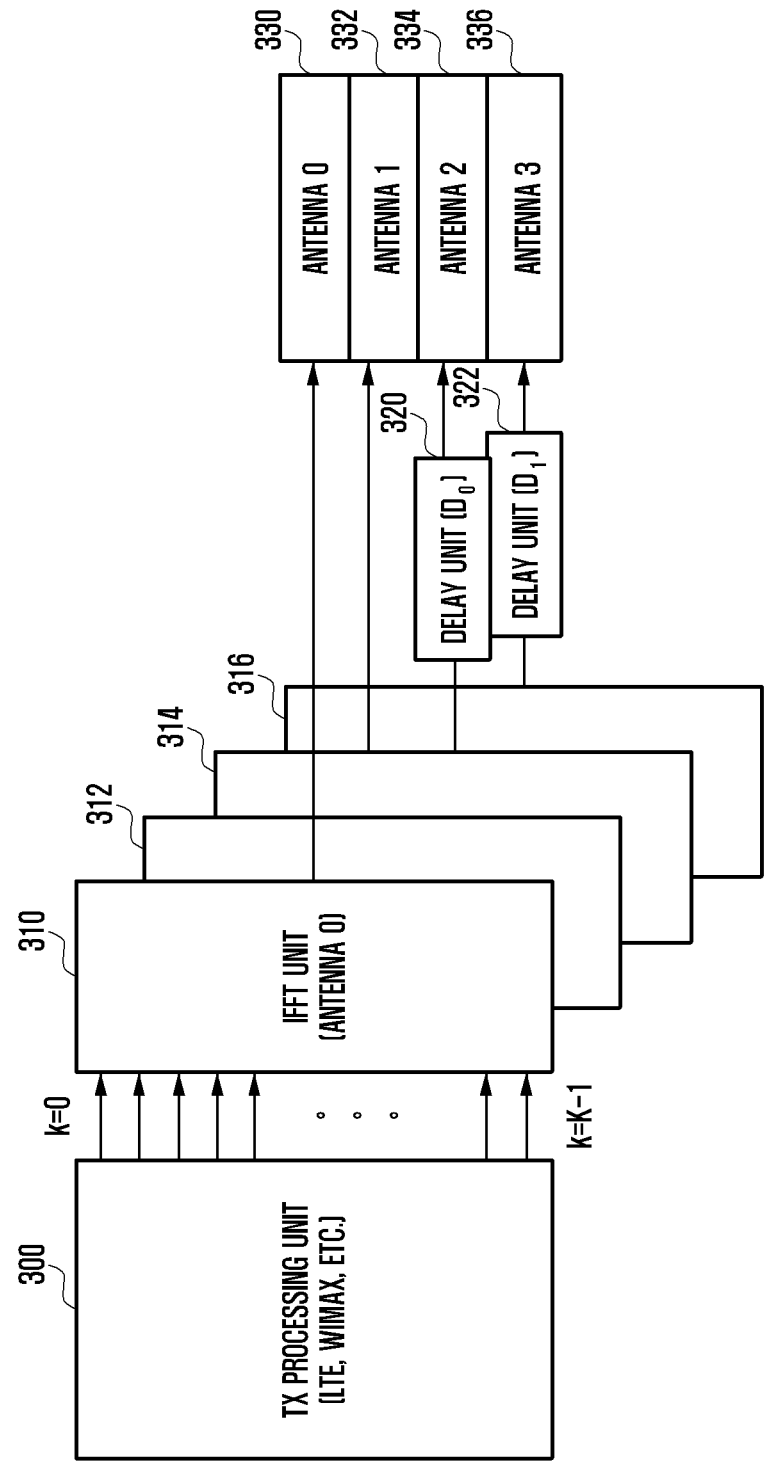
FIG. 3 is a block diagram illustrating an OFDM transmission/reception system with 4 antennas.

FIG. 3 is a block diagram illustrating an OFDM transmission/reception system with 4 antennas.

In reference to FIG. 3, the OFDM transmission/reception system includes a Tx processing unit 300, IFFT units 310, 312, 314, and 316, delay units 320 and 322, and antennas 330, 332, 334, and 336. The TX processing unit processes signals on K subcarriers, and the IFFT unit 310 for antenna 0 330, the IFFT unit 312 for antenna 1 312, the IFFT unit 314 for antenna 3 334, and the IFFT unit 316 for antenna 3 336 perform IFFT on the signals to be mapped to the respective antennas. Here, the signals to be mapped to the antennas 2 and 3 are delayed by the delay units 320 and 322 with D0 and D1, respectively. This system may be understood as an OFDM system with 4 transmit antennas and 2 receive antennas by applying CDD to two transmit antennas.

A signal $y_k$ received by a receiver of the system depicted in FIG. 3 is defined as Equation 1.

$$y_k = H_k D_k T x_k + n_k \quad (1)$$

Here, $H_k$ denotes a channel matrix corresponding to the $k^{th}$ subcarrier, $D_k$ denotes a $k^{th}$ subcarrier response matrix in accordance with a delay diversity, T denotes a transmit precoding matrix, $x_k$ denotes a transmit vector, and $n_k$ denotes a noise vector. Here, $H_k$ and $D_k$ may be defined as Equation 2.

$$H_k \triangleq \begin{bmatrix} h_{0,0}(k) & h_{0,1}(k) & h_{0,2}(k) & h_{0,3}(k) \\ h_{1,0}(k) & h_{1,1}(k) & h_{1,2}(k) & h_{1,3}(k) \end{bmatrix} \quad \text{Equation 1}$$

$$D_k \triangleq \begin{bmatrix} 1 & 0 \\ 0 & 1 \\ e^{j\varphi_0 k} & 0 \\ 0 & e^{j\varphi_1 k} \end{bmatrix} \quad \text{Equation 2}$$

Here, $$\varphi_0 = \frac{2\pi D_0}{N}, \varphi_1 = \frac{2\pi D_1}{N},$$

and $D_0$ and $D_1$ denote delay values corresponding to respective CDD paths, and N denotes the FFT size of the OFDM system. Accordingly, the CDD delay-based receive channel $H_{k,\text{eff}}$ may be calculated by Equation 3.

$$H_{k,\text{eff}} = \quad \text{Equation 3}$$

$$H_k D_k = \begin{bmatrix} h_{0,0}(k) + h_{0,2}(k)e^{j\varphi_0 k} & h_{0,1}(k) + h_{0,3}(k)e^{j\varphi_1 k} \\ h_{1,0}(k) + h_{1,2}(k)e^{j\varphi_0 k} & h_{1,1}(k) + h_{1,3}(k)e^{j\varphi_1 k} \end{bmatrix}$$

In order to observe the effect of the delay diversity, a channel correlation matrix affecting the system throughput may be calculated by Equation 4.

$$R = E\{H_{k,\text{eff}} H_{k,\text{eff}}^H\} = \quad \text{Equation 4}$$

$$E \left\{ \begin{bmatrix} h_{0,0}(k) + & h_{0,1}(k) + \\ h_{0,2}(k)e^{j\varphi_0 k} & h_{0,3}(k)e^{j\varphi_1 k} \\ h_{1,0}(k) + & h_{1,1}(k) + \\ h_{1,2}(k)e^{j\varphi_0 k} & h_{1,3}(k)e^{j\varphi_1 k} \end{bmatrix} \begin{bmatrix} h_{0,0}^*(k) + & h_{1,0}^*(k)^* + \\ h_{0,2}^*(k)e^{-j\varphi_0 k} & h_{1,2}^*(k)^* e^{-j\varphi_0 k} \\ h_{0,1}^*(k) + & h_{1,1}^*(k) + \\ h_{0,3}^*(k)e^{-j\varphi_1 k} & h_{1,3}^*(k)e^{-j\varphi_1 k} \end{bmatrix} \right\}$$

Here, $$R \triangleq \begin{bmatrix} r_{0,0} & r_{0,1} \\ r_{1,0} & r_{1,1} \end{bmatrix},$$

and per-path correlations of the respective channel matrix values are defined as Equation 5.

$$E\{h_{r,0}(k)h_{r,2}^*(k)\} = E\{h_{r,1}(k)h_{r,3}^*(k)\} = \alpha$$

$$E\{h_{r,2}(k)h_{4,0}^*(k)\} = E\{h_{r,3}(k)h_{r,1}^*(k)\} = \alpha^*$$

$$E\{h_{0,t}(k)h_{1,t}^*\} = \beta$$

$$E\{h_{1,t}(k)h_{0,t}^*\} = \beta^* \quad (5)$$

Here, α and β may respectively denote a transmission path correlation (hereinafter, referred to as transmit correlation) and a receive path correlation (hereinafter, referred as receive correlation), and a is expressed in the form of a complex number of $\alpha \triangleq |\alpha|(\cos \varphi_\alpha + j \sin \varphi_\alpha)$. Using the transmit and receive correlations defined as above, the elements of the matrix R are respectively calculated by Equations 6 and 7.

$$r_{0,0} = E\{(h_{0,0}(k) + h_{0,2}(k)e^{j\varphi_0 k})(h_{0,0}^*(k) + h_{0,2}^*(k)e^{-j\varphi_0 k}) + \quad \text{Equation 6}$$
$$(h_{0,1}(k) + h_{0,3}(k)e^{j\varphi_1 k})(h_{0,1}^*(k) + h_{0,3}^*(k)e^{-j\varphi_1 k})\} =$$
$$E\{|h_{0,0}(k)|^2\} + E\{|h_{0,1}(k)|^2\} + E\{|h_{0,2}(k)|^2\} + E\{|h_{0,3}(k)|^2\} +$$
$$E\{h_{0,2}(k)h_{0,0}^*(k)e^{j\varphi_0 k}\} + E\{h_{0,0}(k)h_{0,2}^*(k)e^{-j\varphi_0 k}\} +$$
$$E\{h_{0,3}(k)h_{0,1}^*(k)e^{j\varphi_1 k}\} + E\{h_{0,1}(k)h_{0,3}^*(k)e^{-j\varphi_1 k}\}$$

-continued $$= 4 + \alpha^* e^{j\varphi_0 k} + \alpha e^{-j\varphi_0 k} + \alpha^* e^{j\varphi_1 k} + \alpha e^{-j\varphi_1 k} = \\ 4 + 2\text{Re}\{\alpha^* e^{j\varphi_0 k}\} + 2\text{Re}\{\alpha^* e^{j\varphi_1 k}\} = \\ 4 + 2|\alpha|\cos(\varphi_0 k - \varphi_\alpha) + 2|\alpha|\cos(\varphi_1 k - \varphi_\alpha) = \\ 4\left(1 + |\alpha|\cos\left(\frac{\varphi_0 + \varphi_1}{2}k - \varphi_\alpha\right)\cos\left(\frac{\varphi_0 - \varphi_1}{2}k\right)\right)$$ Equation 1

$$r_{0,1} = E\{h_{0,0}(k)h_{1,0}^*\} + E\{h_{0,2}(k)h_{1,2}^*\} + \\ E\{h_{0,1}(k)h_{1,1}^*\} + E\{h_{0,3}(k)h_{1,3}^*\} + \\ E\{h_{0,2}(k)h_{1,0}^*(k)e^{j\varphi_0 k}\} + \{h_{0,0}(k)h_{1,2}^*(k)e^{-j\varphi_0 k}\} + \\ E\{h_{0,3}(k)h_{1,1}^*(k)e^{j\varphi_1 k}\} + E\{h_{0,1}(k)h_{1,3}^*(k)e^{-j\varphi_1 k}\}$$ Equation 7

$$= \beta + \beta + \beta + \beta + \beta\alpha^* e^{j\varphi_0 k} + \beta\alpha e^{-j\varphi_0 k} + \beta\alpha^* e^{j\varphi_1 k} + \\ \beta\alpha e^{-j\varphi_1 k} = 4\beta\left(1 + |\alpha|\cos\left(\frac{\varphi_0 + \varphi_1}{2}k - \varphi_\alpha\right)\cos\left(\frac{\varphi_0 - \varphi_1}{2}k\right)\right)$$ Equation 2

Because, $r_{1,1}=r_{0,0}$, $r_{1,0}=r^*_{0,1}$ the final matrix R is derived as Equation 8.

Equation 8

$$R = 4\left(1 + |\alpha|\cos\left(\frac{\varphi_0 + \varphi_1}{2}k - \varphi_\alpha\right)\cos\left(\frac{\varphi_0 - \varphi_1}{2}k\right)\right)\begin{bmatrix} 1 & \beta \\ \beta^* & 1 \end{bmatrix}$$ Equation 3

Using Equation 8, it is possible to observe that the matrix R is mainly affected by harmonic components caused by path delays and the transmit correlation. In the case of independent and identically distributed (i.i.d.) channels having the transmit and receive correlations values are 1, i.e., $\alpha=0$ and $\beta=0$, the receiver may achieve a path diversity without performance degradation effect caused by CDD, but there is likely to be subcarriers on which diversity performance is degraded by the component of $$1 + |\alpha|\cos\left(\frac{\varphi_0 + \varphi_1}{2}k - \varphi_\alpha\right)\cos\left(\frac{\varphi_0 - \varphi_1}{2}k\right)$$

as the channel correlation increases.

Figure 4:
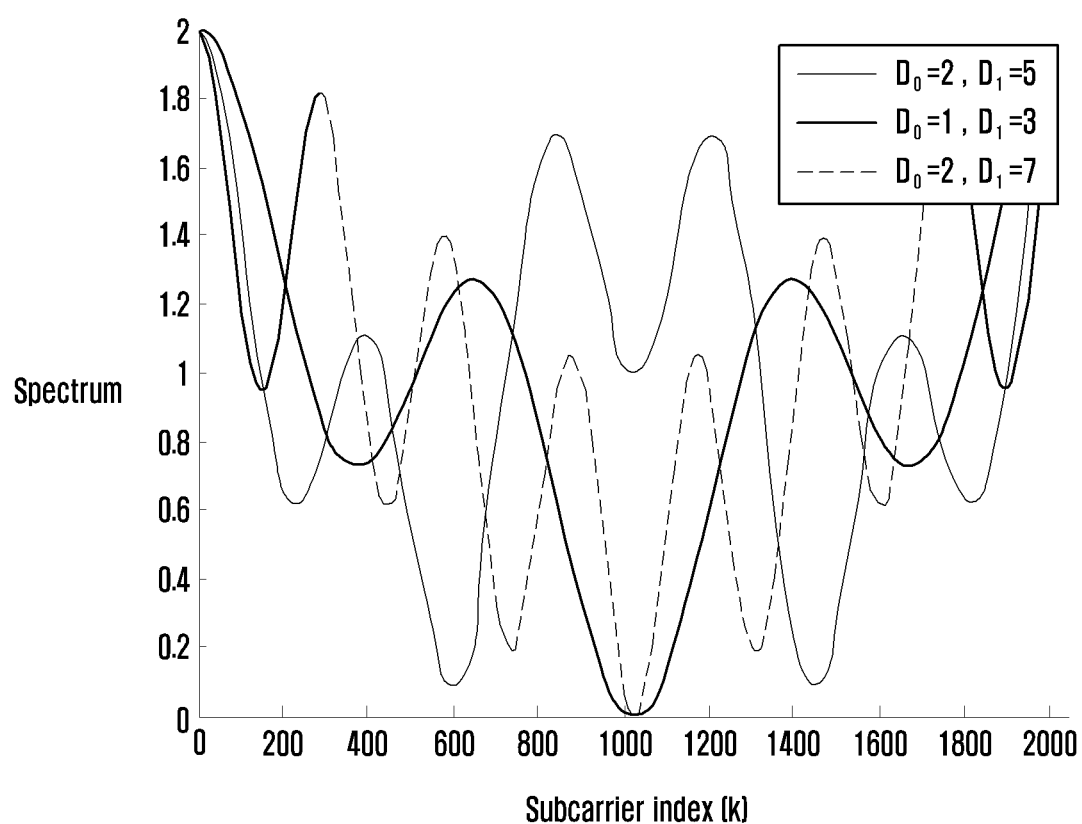
FIG. 4 is a diagram illustrating frequency responses represented by Equation 8 in accordance with a specific CDD value under an assumption of a transmit channel correlation $\alpha=1$.

FIG. 4 is a diagram illustrating frequency responses represented by Equation 8 in accordance with a specific CDD value under an assumption of a transmit channel correlation $\alpha=1$.

From FIG. 4, it is observed that the impact to the per-frequency signal varies according to the path-specific delay value. In the case of using a fixed delay, although it is advantageous that the delay harmonic components of the CDD drop a specific subcarrier response below 1 so as to obtain diversity gain from frequency selectivity, a high correlation between the antennas is likely to cause frequency nulling on a specific subcarrier, which is likely to degrade the signal reception performance.

The present invention proposes a band selective phase switching antenna mapping (BS-PSAM) as an algorithm for shifting the phase of a signal to be mapped to different antennas in order to transmit the signal in different subbands of a frequency band, which has not been considered until now in the legacy CDD and VAM algorithms. The BS-PSAM is a method for achieving both the frequency selective diversity and signal-to-noise-ratio (SNR) gains simultaneously by applying a frequency domain phase switching mapping per antenna in consideration of the subband selective channel condition.

Figure 5:
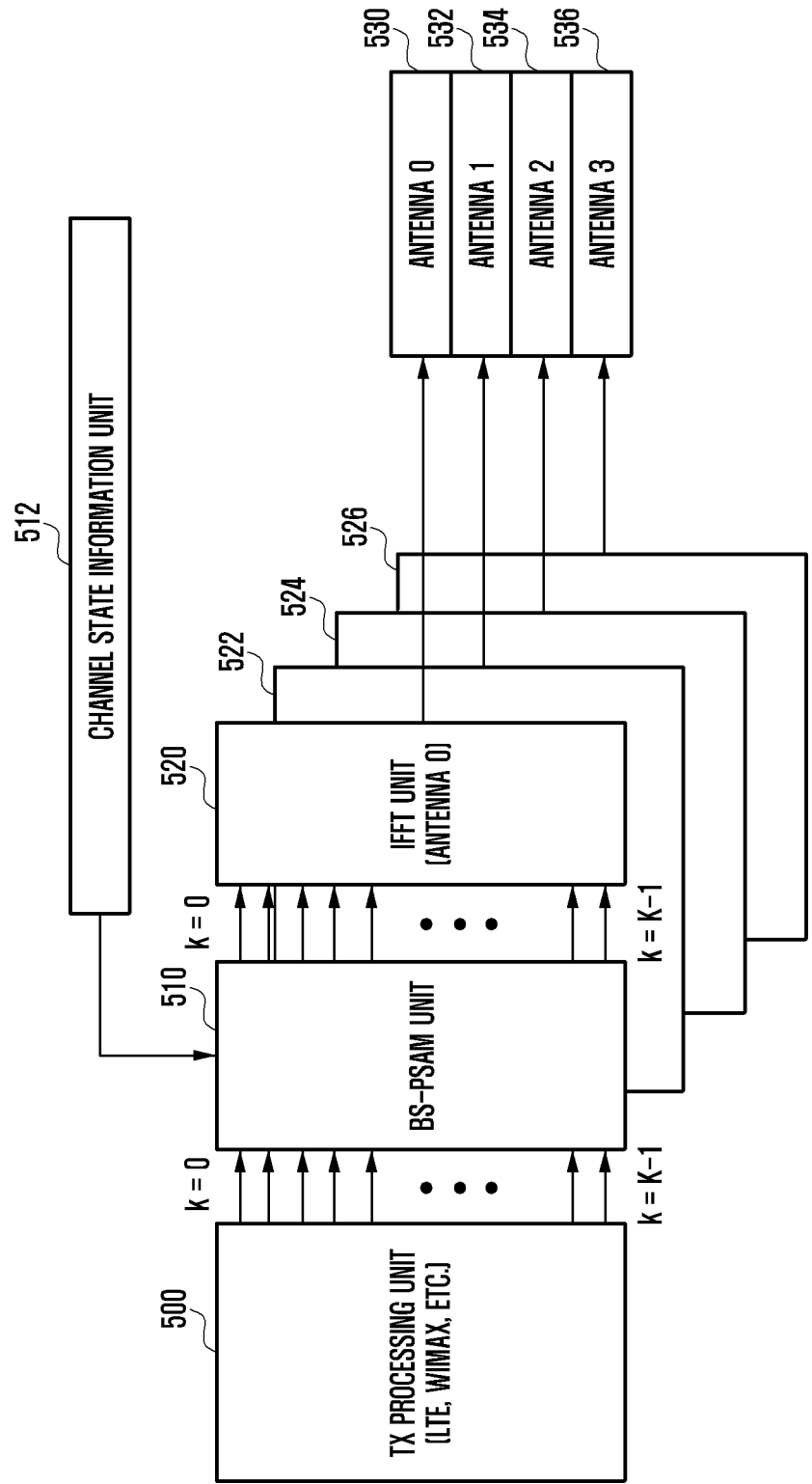
FIG. 5 is a diagram illustrating a configuration of a BS-PSAM system according to an embodiment of the present invention.

FIG. 5 is a diagram illustrating a configuration of a BS-PSAM system according to an embodiment of the present invention. FIG. 5 depicts a case where the BS-PSAM system is employed at a base station in order to apply the corresponding technology to downlink signals being transmitted from the base station to a terminal.

In reference to FIG. 5, the BS-PSAM system includes a TX processing unit 500, a BS-PSAM unit 510, IFFT units 520, 522, 524, and 526, a channel state information unit 512, and antennas 530, 532, and 536. The TX processing unit processes signals on K subcarriers and outputs the processed signals to the BS-PSAM unit, and the BS-PSASM unit receives uplink feedback information and/or sounding reference signal (SRS) transmitted by the terminal or uplink channel state information calculated based on the SRS from the channel state information unit and applies CDD by resource block scheduled per UE. The IFFT unit performs IFFT on the CDD-applied signals, and the signals mapped to the respective antennas are transmitted to the terminal.

Figure 6:
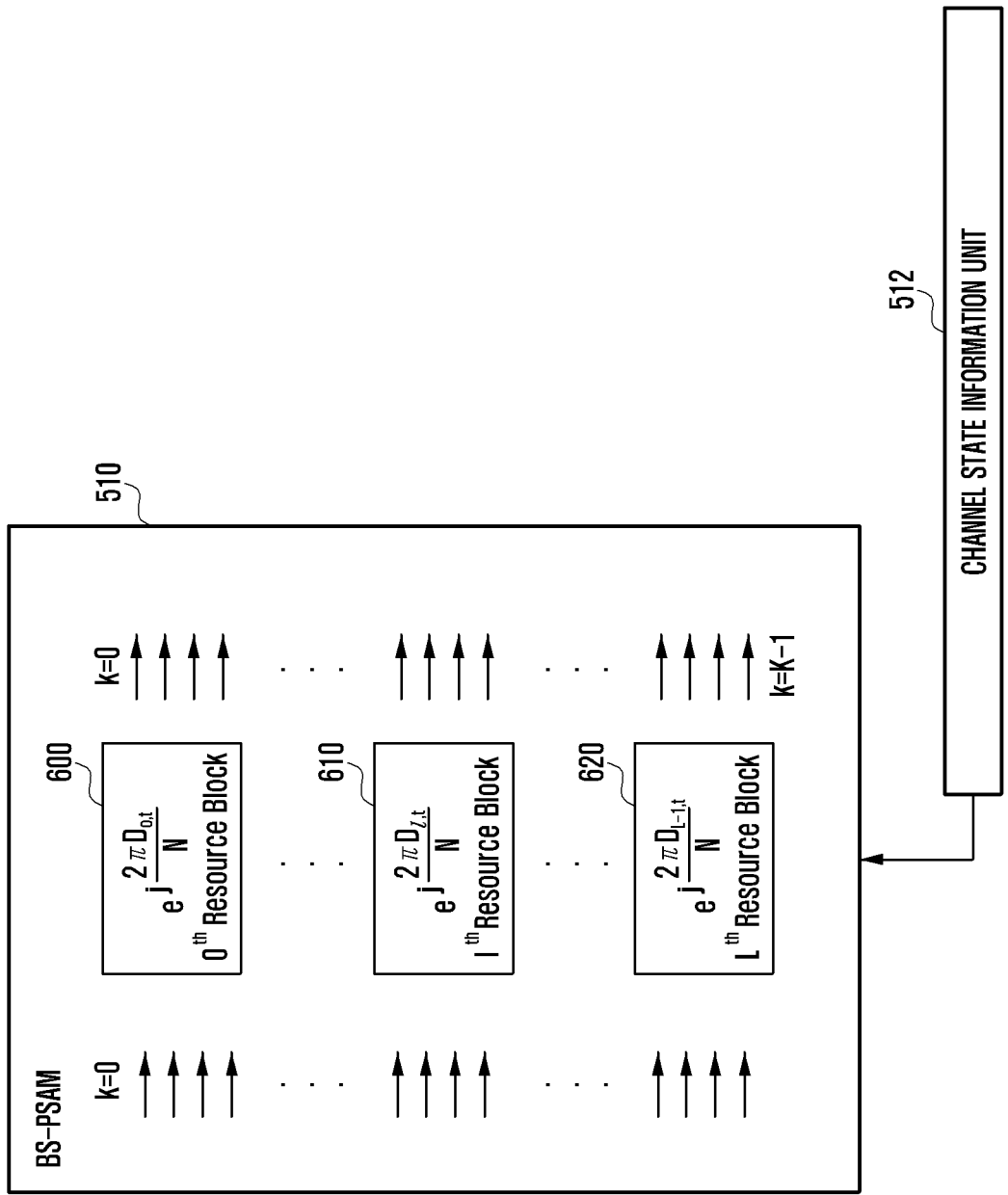
FIG. 6 is a diagram for explaining functions of a BS-PSAM unit according to an embodiment of the present invention.

FIG. 6 is a diagram for explaining functions of a BS-PSAM unit according to an embodiment of the present invention.

In FIG. 6, t denotes the $t^{th}$ transmit antenna, l denotes the $l^{th}$ resource block. Here, the delay phase corresponding to the $t^{th}$ transmit antenna and the $l^{th}$ resource block may be expressed as Formula 9.

$$e^{j\frac{2\pi D_{l,t}}{N}}$$ Formula 9

In Formula 9, N denotes the FFT size, and t denotes the CDD delay value. The BS-PSAM unit 510 applies a different delay value of formula 9 per resource block. That is, unlike the legacy configuration of applying predetermined delay values in the time domain or predetermined phase rotation values in the frequency domain, the CDD is applied in unit of scheduled resource blocks for a terminal to reflect the frequency-selective characteristic, thereby making it possible to change the phase in unit of minimum resource block and map the signals to the antennas. The BS-PSAM unit determines the delay value based on the channel state information from the channel state information unit and/or information related thereto.

Hereinafter, a description is made of the method for determining a delay value to be applied per resource block.

First, an algorithm for finding the frequency selective phase rotation values $\varphi_{l,0}$ and $\varphi_{l,1}$ (or delay values $D_0$ and $D_1$) that maximize the reception SNR per resource block based on Equation 8 is applied. This may be expressed as Equation 10.

Equation 4

$$(\widetilde{\varphi_{l,0}}, \widetilde{\varphi_{l,1}}) = \arg \max_{(\varphi_{l,0}, \varphi_{l,1})} \sum_{k \in \{\text{subcarrier index}\}} \left(1 + |\alpha|\cos\left(\frac{\varphi_{l,0} + \varphi_{l,1}}{2}k - \varphi_\alpha\right)\cos\left(\frac{\varphi_{l,0} + \varphi_{l,1}}{2}k\right)\right)$$ Equation 10

In Equation 10, $\varphi_{l,0}$ and $\varphi_{l,1}$ denote per-antenna phase rotation values corresponding to the $i^{th}$ resource block.

From Equation 10, it is observed that the transmit correlation value a should be estimated for fining a pair of the phase rotation values ($\widetilde{\varphi_{l,0}}$, $\widetilde{\varphi_{l,1}}$) maximizing the per-resource block reception SNR. Here, the transmit correlation value a means a correlations between signal transmission paths when the receive antenna is fixed. Accordingly, it is necessary to propose a method for estimating the transmit correlation value a in the present invention. The present invention proposes transmit correlation estimation methods for use in a time division duplex (TDD) system and a frequency division duplex (FDD) method as follows.

In the TDD system, it may be possible to consider a method for a base station modem to estimate the transmit correlation autonomously based on an SRS or a reference signal being transmitted along with a data channel in uplink, exploiting reciprocity between uplink (UL) and downlink (DL) channels. In the FDD system, however, it is necessary to depend on the CQI information transmitted by a terminal because there is no reciprocity between the UL and DL channels. In this case, the CQI information has to include the correlation value a estimated based on a pilot signal transmitted by the base station, which applies neither per-resource block nor per-antenna phase shift to the pilot signal. For example, a discussion is underway on a pilot pattern in order for a terminal to measure an antenna correlation and report a measurement result for data transmission in a millimeter wave spectrum in the 5G system.

It may also be possible to exploit a subband CQI feedback method in use for the legacy LTE FDD system with no modification from the standard technology. The base station may store information on a few pairs of $\varphi_\alpha$ values (phase rotation per transmission path correlation) and select one pair among the ($\widetilde{\varphi}_{t,0}$, $\widetilde{\varphi}_{t,1}$) t∈{0, . . . , T-1} pairs predetermined for respective subframes to transmit a signal with the selected pair. The signal to which the pair is applied may be a downlink reference signal. The terminal estimates the subband CQI based on based on the signals to which the ($\widetilde{\varphi}_{t,0}$, $\widetilde{\varphi}_{t,1}$)t pair has been applied and feeds back the subband CQI to the base station so as to select the ($\widetilde{\varphi}_{t,0}$, $\widetilde{\varphi}_{t,1}$)t pair corresponding to the highest subband CQI. This may be expressed by Equation 11.

Equation 5

$$(\widetilde{\varphi}_{t,0}, \widetilde{\varphi}_{t,1})\tilde{t} = \arg\max_t \sum_{k\in\{subcarrier\ index\}} \left(1 + |\alpha|\cos\left(\frac{\varphi_{l,0,t} + \varphi_{l,1,t}}{2}k - \varphi_{\alpha,t}\right)\cos\left(\frac{\varphi_{l,0,t} + \varphi_{l,1,t}}{2}k\right)\right)$$

Equation 11

Second, it may be possible to consider a method for finding per-resource block phase rotation values based on the estimated transmit correlation value a using tables ($\widetilde{\varphi}_{t,0}$, $\widetilde{\varphi}_{t,1}$) tables associated with predetermined $\varphi_\alpha$ values like Tables 14 to 1-10 or Tables 1-1 to 1-10. Tables 1-1 to 1-10 are listing the ($\widetilde{\varphi}_{t,0}$, $\widetilde{\varphi}_{t,1}$) values for $\varphi_\alpha$=0, and Tables 2-1 to 2-10 are list the ($\widetilde{\varphi}_{t,0}$, $\widetilde{\varphi}_{t,1}$) values for $\varphi_\alpha$=0.1. It may be possible to derive ($\widetilde{\varphi}_{t,0}$, $\widetilde{\varphi}_{t,1}$) tables containing various $\varphi_\alpha$ values from Equation 10.

TABLE 1-1

| RB index | $\widetilde{\varphi}_{t,0}$ | $\widetilde{\varphi}_{t,1}$ | average SNR |
|---|---|---|---|
| 0 | −0.004295 | −0.004295 | 1.99908265 |
| 1 | 0.0042951 | 0.0042951 | 1.999825663 |
| 2 | 0.0042951 | 0.0042951 | 1.997913174 |
| 3 | −0.016874 | −0.016874 | 1.998304077 |
| 4 | 0.0125786 | 0.0125786 | 1.998363518 |
| 5 | −0.008283 | −0.008283 | 1.9991622 |

TABLE 1-1-continued

| RB index | $\widetilde{\varphi}_{t,0}$ | $\widetilde{\varphi}_{t,1}$ | average SNR |
|---|---|---|---|
| 6 | 0.0082835 | 0.0082835 | 1.997136011 |
| 7 | 0.0122718 | 0.0122718 | 1.998933659 |
| 8 | 0.0202485 | 0.0202485 | 1.996728504 |
| 9 | −0.003988 | −0.003988 | 1.998372471 |
| 10 | −0.003988 | −0.003988 | 1.999876978 |

TABLE 1-2

| RB index | $\widetilde{\varphi}_{t,0}$ | $\widetilde{\varphi}_{t,1}$ | average SNR |
|---|---|---|---|
| 11 | 0.0039884 | 0.0039884 | 1.999091604 |
| 12 | −0.019635 | −0.019635 | 1.996502664 |
| 13 | 0.0156466 | 0.0156466 | 1.997270554 |
| 14 | −0.011658 | −0.011658 | 1.997717521 |
| 15 | −0.00767 | −0.00767 | 1.99894363 |
| 16 | −0.00767 | −0.00767 | 1.998167664 |
| 17 | −0.011351 | −0.011351 | 1.998637299 |
| 18 | −0.015033 | −0.015033 | 1.998037906 |
| 19 | −0.018715 | −0.018715 | 1.996533485 |
| 20 | 0.0036816 | 0.0036816 | 1.998744714 |

TABLE 1-3

| RB index | $\widetilde{\varphi}_{t,0}$ | $\widetilde{\varphi}_{t,1}$ | average SNR |
|---|---|---|---|
| 21 | −0.003682 | −0.003682 | 1.99991002 |
| 22 | −0.003682 | −0.003682 | 1.999124066 |
| 23 | −0.021783 | −0.021783 | 1.99683223 |
| 24 | −0.014419 | −0.014419 | 1.998534571 |
| 25 | −0.010738 | −0.010738 | 1.999098863 |
| 26 | −0.017794 | −0.017794 | 1.998114407 |
| 27 | 0.0070563 | 0.0070563 | 1.999420783 |
| 28 | −0.007056 | −0.007056 | 1.997850128 |
| 29 | −0.010431 | −0.010431 | 1.997672276 |
| 30 | 0.0104311 | 0.0104311 | 1.997096989 |

TABLE 1-4

| RB index | $\widetilde{\varphi}_{t,0}$ | $\widetilde{\varphi}_{t,0}$ | average SNR |
|---|---|---|---|
| 31 | 0.0171806 | 0.0171806 | 1.996852672 |
| 32 | 0.0033748 | 0.0033748 | 1.996566684 |
| 33 | 0.0033748 | 0.0033748 | 1.999068256 |
| 34 | 0.0033748 | 0.0033748 | 1.999931566 |
| 35 | −0.003375 | −0.003375 | 1.999155197 |
| 36 | −0.003375 | −0.003375 | 1.996740423 |
| 37 | 0.016567 | 0.016567 | 1.998166934 |
| 38 | 0.0131922 | 0.0131922 | 1.997293343 |
| 39 | 0.0098175 | 0.0098175 | 1.99931745 |
| 40 | −0.01626 | −0.01626 | 1.998157559 |

TABLE 1-5

| RB index | $\widetilde{\varphi}_{t,0}$ | $\widetilde{\varphi}_{t,1}$ | average SNR |
|---|---|---|---|
| 41 | −0.006443 | −0.006443 | 1.999238939 |
| 42 | 0.0064427 | 0.0064427 | 1.998729232 |
| 43 | 0.0159534 | 0.0159534 | 1.998475012 |
| 44 | −0.009511 | −0.009511 | 1.999452564 |
| 45 | −0.012579 | −0.012579 | 1.997422592 |
| 46 | −0.015647 | −0.015647 | 1.997870934 |
| 47 | −0.021783 | −0.021783 | 1.99652743 |
| 48 | −0.003068 | −0.003068 | 1.998333747 |
| 49 | −0.003068 | −0.003068 | 1.9997451 |
| 50 | 0.0003068 | 0.0003068 | 1.999997451 |

TABLE 1-6

| RB index | $\widetilde{\varphi_{l,0}}$ | $\widetilde{\varphi_{l,1}}$ | average SNR |
| --- | --- | --- | --- |
| 51 | 0.0003068 | 0.0003068 | 1.999983332 |
| 52 | 0.0003068 | 0.0003068 | 1.99995566 |
| 53 | 0.0003068 | 0.0003068 | 1.999914435 |
| 54 | 0.0003068 | 0.0003068 | 1.999859657 |
| 55 | 0.0003068 | 0.0003068 | 1.999791327 |
| 56 | 0.0003068 | 0.0003068 | 1.999709446 |
| 57 | 0.0003068 | 0.0003068 | 1.999614015 |
| 58 | 0.0003068 | 0.0003068 | 1.999505036 |
| 59 | 0.0003068 | 0.0003068 | 1.999382509 |
| 60 | 0.0003068 | 0.0003068 | 1.999246437 |

TABLE 1-7

| RB index | $\widetilde{\varphi_{l,0}}$ | $\widetilde{\varphi_{l,1}}$ | average SNR |
| --- | --- | --- | --- |
| 61 | 0.0003068 | 0.0003068 | 1.999096822 |
| 62 | 0.0003068 | 0.0003068 | 1.998933664 |
| 63 | 0.0003068 | 0.0003068 | 1.998756968 |
| 64 | 0.0003068 | 0.0003068 | 1.998566734 |
| 65 | 0.0003068 | 0.0003068 | 1.998362966 |
| 66 | 0.0003068 | 0.0003068 | 1.998145667 |
| 67 | 0.0003068 | 0.0003068 | 1.997914839 |
| 68 | 0.0003068 | 0.0003068 | 1.997670485 |
| 69 | 0.0003068 | 0.0003068 | 1.997412609 |
| 70 | 0.0003068 | 0.0003068 | 1.997141214 |

TABLE 1-8

| RB index | $\widetilde{\varphi_{l,0}}$ | $\widetilde{\varphi_{l,1}}$ | average SNR |
| --- | --- | --- | --- |
| 71 | 0.0003068 | 0.0003068 | 1.996856304 |
| 72 | 0.0003068 | 0.0003068 | 1.996557883 |
| 73 | 0.0003068 | 0.0003068 | 1.996245955 |
| 74 | −0.021476 | −0.021476 | 1.996398992 |
| 75 | 0.0205553 | 0.0205553 | 1.997339761 |
| 76 | −0.019635 | −0.019635 | 1.997271747 |
| 77 | −0.019021 | −0.019021 | 1.997839901 |
| 78 | 0.0184078 | 0.0184078 | 1.997752124 |
| 79 | −0.017794 | −0.017794 | 1.997806279 |
| 80 | −0.017181 | −0.017181 | 1.998151233 |

TABLE 1-9

| RB index | $\widetilde{\varphi_{l,0}}$ | $\widetilde{\varphi_{l,1}}$ | average SNR |
| --- | --- | --- | --- |
| 81 | −0.016567 | −0.016567 | 1.998286458 |
| 82 | −0.015953 | −0.015953 | 1.997061872 |
| 83 | 0.0156466 | 0.0156466 | 1.998435909 |
| 84 | −0.015033 | −0.015033 | 1.997304029 |
| 85 | 0.0147262 | 0.0147262 | 1.998705355 |
| 86 | 0.0144194 | 0.0144194 | 1.997973442 |
| 87 | −0.013806 | −0.013806 | 1.996841393 |
| 88 | −0.013499 | −0.013499 | 1.998120222 |
| 89 | −0.013192 | −0.013192 | 1.998688241 |
| 90 | −0.012885 | −0.012885 | 1.998907147 |

TABLE 1-10

| RB index | $\widetilde{\varphi_{l,0}}$ | $\widetilde{\varphi_{l,1}}$ | average SNR |
| --- | --- | --- | --- |
| 91 | 0.0125786 | 0.0125786 | 1.998976548 |
| 92 | −0.012272 | −0.012272 | 1.998933659 |
| 93 | −0.011965 | −0.011965 | 1.998653225 |
| 94 | −0.011658 | −0.011658 | 1.997847622 |
| 95 | −0.02301 | −0.02301 | 1.996812857 |
| 96 | 0.0113515 | 0.0113515 | 1.997632067 |
| 97 | −0.011045 | −0.011045 | 1.999115135 |

TABLE 1-10-continued

| RB index | $\widetilde{\varphi_{l,0}}$ | $\widetilde{\varphi_{l,1}}$ | average SNR |
| --- | --- | --- | --- |
| 98 | −0.010738 | −0.010738 | 1.998910764 |
| 99 | 0.0211689 | 0.0211689 | 1.997160253 |

TABLE 2-1

| RB index | $\widetilde{\varphi_{l,0}}$ | $\widetilde{\varphi_{l,1}}$ | average SNR |
| --- | --- | --- | --- |
| 0 | 0.0006136 | 0.0006136 | 1.9999646 |
| 1 | 0.0006136 | 0.0006136 | 1.9999975 |
| 2 | 0.0006136 | 0.0006136 | 1.9999761 |
| 3 | 0.0006136 | 0.0006136 | 1.9999005 |
| 4 | 0.0006136 | 0.0006136 | 1.9997707 |
| 5 | 0.0006136 | 0.0006136 | 1.9995867 |
| 6 | 0.0006136 | 0.0006136 | 1.9993486 |
| 7 | 0.0006136 | 0.0006136 | 1.9990562 |
| 8 | 0.0006136 | 0.0006136 | 1.9987097 |
| 9 | 0.0046019 | 0.0046019 | 1.99987 |

TABLE 2-2

| RB index | $\widetilde{\varphi_{l,0}}$ | $\widetilde{\varphi_{l,1}}$ | average SNR |
| --- | --- | --- | --- |
| 11 | −0.007363 | −0.007363 | 1.9996463 |
| 12 | −0.003375 | −0.003375 | 1.9999002 |
| 13 | 0.0122718 | 0.0122718 | 1.999101 |
| 14 | 0.0082835 | 0.0082835 | 1.9989901 |
| 15 | 0.0159534 | 0.0159534 | 1.9981166 |
| 16 | −0.014726 | −0.014726 | 1.9987081 |
| 17 | −0.007056 | −0.007056 | 1.9992694 |
| 18 | 0.0042951 | 0.0042951 | 1.9998127 |
| 19 | 0.0042951 | 0.0042951 | 1.9991257 |
| 20 | 0.0116583 | 0.0116583 | 1.9991705 |

TABLE 2-3

| RB index | $\widetilde{\varphi_{l,0}}$ | $\widetilde{\varphi_{l,1}}$ | average SNR |
| --- | --- | --- | --- |
| 21 | 0.0116583 | 0.0116583 | 1.9902869 |
| 22 | −0.014113 | −0.014113 | 1.9987976 |
| 23 | −0.00675 | −0.00675 | 1.9997047 |
| 24 | −0.003068 | −0.003068 | 1.9991308 |
| 25 | −0.003068 | −0.003068 | 1.9999377 |
| 26 | −0.003068 | −0.003068 | 1.9993895 |
| 27 | −0.010124 | −0.010124 | 1.9983165 |
| 28 | 0.0110447 | 0.0110447 | 1.9991629 |
| 29 | 0.0039884 | 0.0039884 | 1.9999036 |
| 30 | −0.006443 | −0.006443 | 1.9995996 |

TABLE 2-4

| RB index | $\widetilde{\varphi_{l,0}}$ | $\widetilde{\varphi_{l,1}}$ | average SNR |
| --- | --- | --- | --- |
| 31 | 0.0073631 | 0.0073631 | 1.9993642 |
| 32 | 0.0107379 | 0.0107379 | 1.9991379 |
| 33 | 0.0174874 | 0.0174874 | 1.9978155 |
| 34 | 0.0073631 | 0.0073631 | 1.9710113 |
| 35 | −0.019635 | −0.019635 | 1.9976198 |
| 36 | −0.009511 | −0.009511 | 1.9993139 |
| 37 | −0.006136 | −0.006136 | 1.9995007 |
| 38 | 0.0070563 | 0.0070563 | 1.999674 |
| 39 | −0.012579 | −0.012579 | 1.9970831 |
| 40 | 0.0036816 | 0.0036816 | 1.9978141 |

TABLE 2-5

| RB index | $\widetilde{\varphi_{l,0}}$ | $\widetilde{\varphi_{l,1}}$ | average SNR |
|---|---|---|---|
| 41 | 0.0036816 | 0.0036816 | 1.9997046 |
| 42 | 0.0036816 | 0.0036816 | 1.9996442 |
| 43 | 0.0131922 | 0.0131922 | 1.997683 |
| 44 | −0.012272 | −0.012272 | 1.9955867 |
| 45 | 0.0067495 | 0.0067495 | 1.9996658 |
| 46 | −0.005829 | −0.005829 | 1.999511 |
| 47 | −0.008897 | −0.008897 | 1.9995284 |
| 48 | −0.015033 | −0.015033 | 1.9986334 |
| 49 | −0.033441 | −0.033441 | 1.9918851 |
| 50 | 0.1076855 | 0.1076855 | 1.913719 |

TABLE 2-6

| RB index | $\widetilde{\varphi_{l,0}}$ | $\widetilde{\varphi_{l,1}}$ | average SNR |
|---|---|---|---|
| 51 | 0.0469398 | 0.0469398 | 1.9864297 |
| 52 | 0.0291456 | 0.0291456 | 1.9948854 |
| 53 | 0.0211689 | 0.0211689 | 1.997332 |
| 54 | 0.016567 | 0.016567 | 1.9983612 |
| 55 | 0.013499 | 0.013499 | 1.9989119 |
| 56 | 0.0113515 | 0.0113515 | 1.9991927 |
| 57 | 0.0098175 | 0.0098175 | 1.9993595 |
| 58 | 0.0088971 | 0.0088971 | 1.999457 |
| 59 | 0.0079767 | 0.0079767 | 1.9995321 |
| 60 | 0.0070563 | 0.0070563 | 1.9996762 |

TABLE 2-7

| RB index | $\widetilde{\varphi_{l,0}}$ | $\widetilde{\varphi_{l,1}}$ | average SNR |
|---|---|---|---|
| 61 | 0.0064427 | 0.0064427 | 1.9997232 |
| 62 | 0.0058291 | 0.0058291 | 1.9995396 |
| 63 | 0.0055223 | 0.0055223 | 1.9998149 |
| 64 | 0.0052155 | 0.0052155 | 1.9997868 |
| 65 | 0.0049087 | 0.0049087 | 1.9997366 |
| 66 | 0.0046019 | 0.0046019 | 1.9997829 |
| 67 | 0.0042951 | 0.0042951 | 1.9998816 |
| 68 | 0.0039884 | 0.0039884 | 1.999826 |
| 69 | 0.0039884 | 0.0039884 | 1.9992834 |
| 70 | 0.0036816 | 0.0036816 | 1.9998911 |

TABLE 2-8

| RB index | $\widetilde{\varphi_{l,0}}$ | $\widetilde{\varphi_{l,1}}$ | average SNR |
|---|---|---|---|
| 71 | 0.0033748 | 0.0033748 | 1.9995506 |
| 72 | 0.0033748 | 0.0033748 | 1.9998493 |
| 73 | 0.003068 | 0.003068 | 1.9993895 |
| 74 | 0.003068 | 0.003068 | 1.9999377 |
| 75 | 0.003068 | 0.003068 | 1.9991308 |
| 76 | 0.0027612 | 0.0027612 | 1.9997431 |
| 77 | 0.0027612 | 0.0027612 | 1.9998756 |
| 78 | 0.0027612 | 0.0027612 | 1.9989106 |
| 79 | 0.0024544 | 0.0024544 | 1.9995164 |
| 80 | 0.0024544 | 0.0024544 | 1.999964 |

TABLE 2-9

| RB index | $\widetilde{\varphi_{l,0}}$ | $\widetilde{\varphi_{l,1}}$ | average SNR |
|---|---|---|---|
| 81 | 0.0024544 | 0.0024544 | 1.9995443 |
| 82 | −0.013806 | −0.013806 | 1.9988328 |
| 83 | 0.0021476 | 0.0021476 | 1.9993389 |
| 84 | 0.0021476 | 0.0021476 | 1.9999242 |
| 85 | 0.0021476 | 0.0021476 | 1.9998455 |
| 86 | 0.0021476 | 0.0021476 | 1.9991028 |
| 87 | −0.011965 | −0.011965 | 1.9991222 |
| 88 | −0.011658 | −0.011658 | 1.9991521 |

TABLE 2-9-continued

| RB index | $\widetilde{\varphi_{l,0}}$ | $\widetilde{\varphi_{l,1}}$ | average SNR |
|---|---|---|---|
| 89 | 0.0018408 | 0.0018408 | 1.9996274 |
| 90 | 0.0018408 | 0.0018408 | 1.9999699 |

TABLE 2-10

| RB index | $\widetilde{\varphi_{l,0}}$ | $\widetilde{\varphi_{l,1}}$ | average SNR |
|---|---|---|---|
| 91 | 0.0018408 | 0.0018408 | 1.9998245 |
| 92 | 0.0018408 | 0.0018408 | 1.9991912 |
| 93 | 0.0138058 | 0.0138058 | 1.9984044 |
| 94 | −0.010124 | −0.010124 | 1.9989909 |
| 95 | −0.009817 | −0.009817 | 1.9992651 |
| 96 | 0.001534 | 0.001534 | 1.9990499 |
| 97 | 0.001534 | 0.001534 | 1.9996769 |
| 98 | 0.001534 | 0.001534 | 1.9999651 |
| 99 | 0.001534 | 0.001534 | 1.9999146 |

Figure 7:
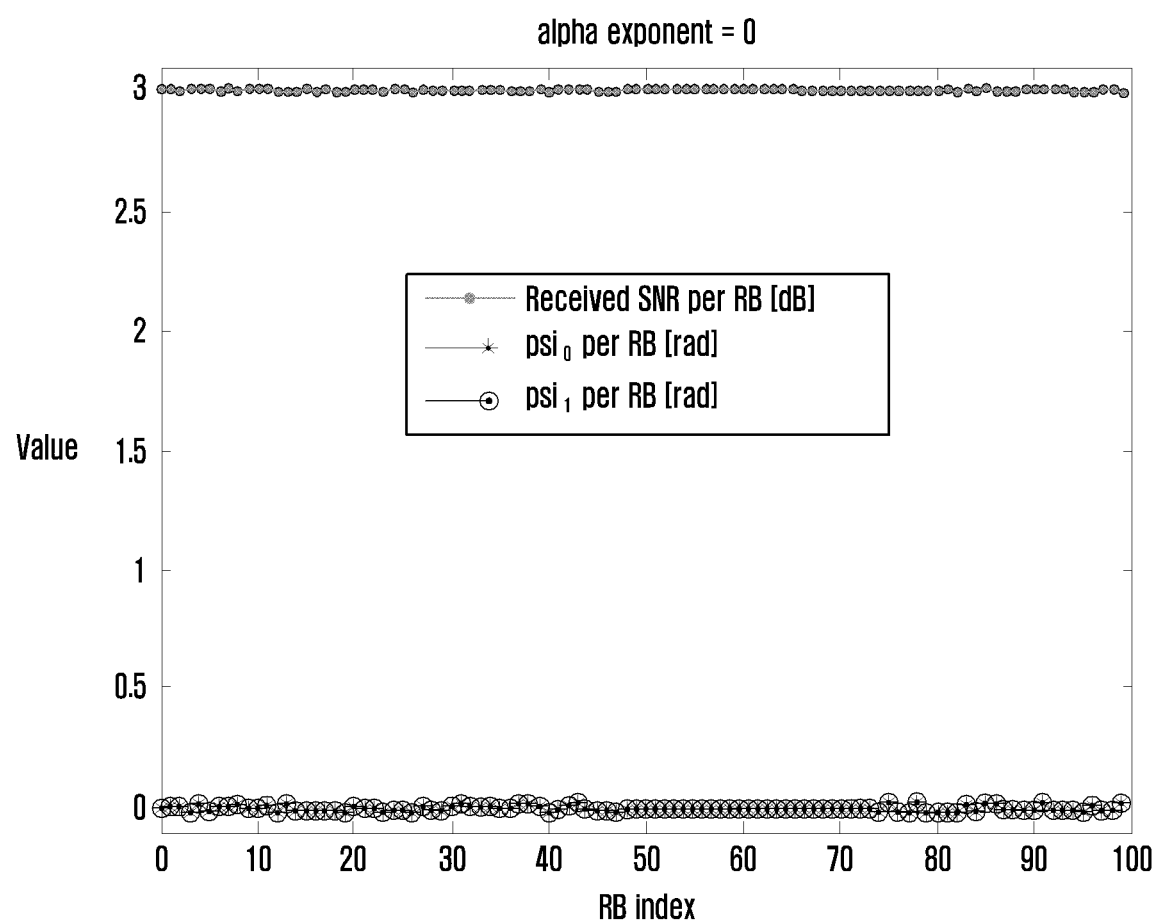
FIGS. 7 and 8 are diagrams for explaining reception SNRs for a case where the proposed BS-PSAM technology is applied along with $\varphi_\alpha$ value of 0 and 0.9, respectively according to an embodiment of the present invention.
Figure 8:
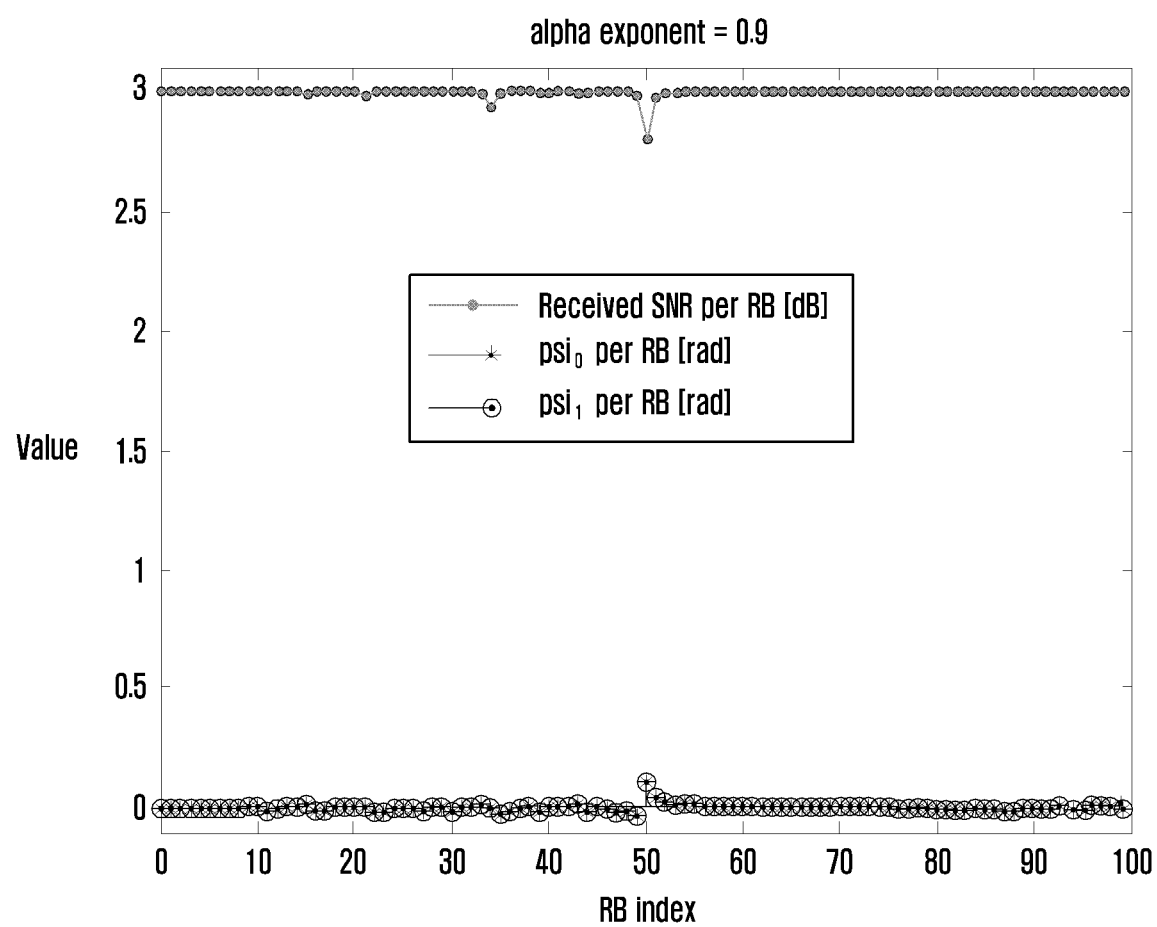

FIGS. 7 and 8 are diagrams for explaining reception SNRs for a case where the proposed BS-PSAM technology is applied along with $\varphi_\alpha$ value of 0 and 0.9, respectively according to an embodiment of the present invention.

From FIGS. 7 and 8, it is observed that a reception gain close to the logical reception SNR of 3 dB achievable with extension from 2T to 4T may be obtained by applying the ($\widetilde{\varphi_{l,0}}$, $\widetilde{\varphi_{l,1}}$) table proposed in the present invention when the phase $\varphi_\alpha$ is known by estimating the correlation value a of the transmission path.

Figure 9:
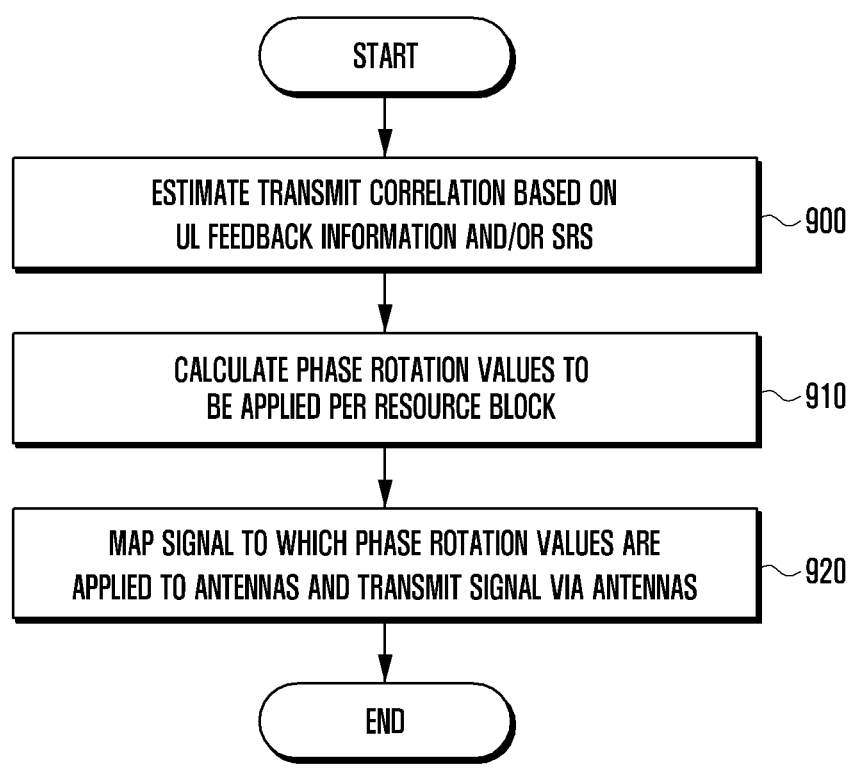
FIG. 9 is a flowchart illustrating an operation of a transmitter according to an embodiment of the present invention. Here, the transmitter may be a base station.

FIG. 9 is a flowchart illustrating an operation of a transmitter according to an embodiment of the present invention. Here, the transmitter may be a base station.

In reference to FIG. 9, the base station may estimate a transmit correlation based on uplink feedback information or SRS at step 900. Here, the uplink feedback information may be a subband CQI. At step 910, the base station calculates phase rotation values to be applied to a signal per resource block (or small unit of frequency band that corresponds to a resource block) using one of two methods proposed in the present invention based on a transmit correlation. At step 920, the base station maps the signal to which the calculated per-resource block phase rotation values have been applied to antennas and transmits the mapped signal.

Figure 10:
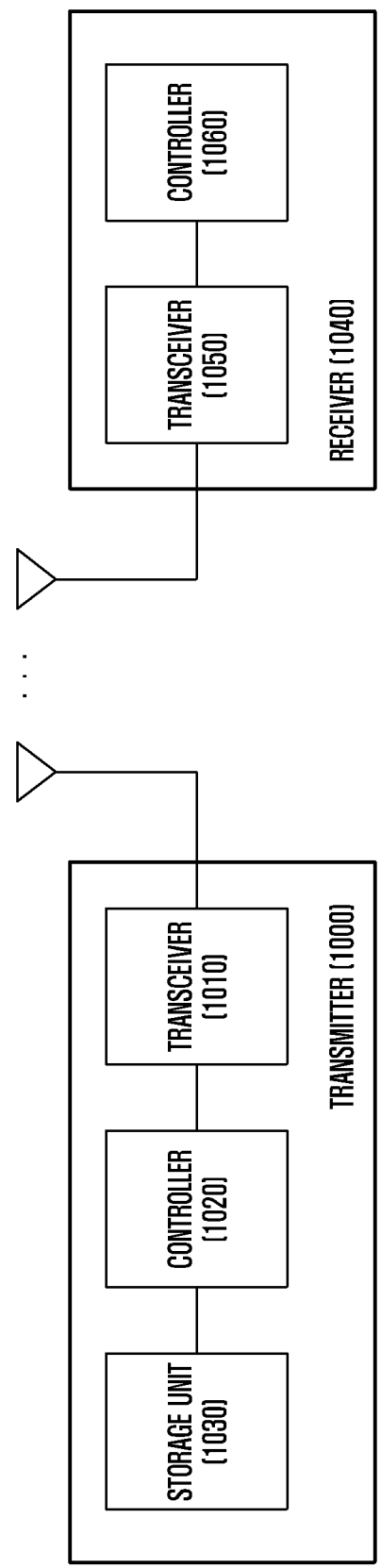
FIG. 10 is a diagram illustrating a transmitter and a receiver according to an embodiment of the present invention.

FIG. 10 is a diagram illustrating a transmitter and a receiver according to an embodiment of the present invention. The transmitter may be a base station, and the receiver may be a terminal.

In reference to FIG. 10, the transmitter 1000 may include a transceiver 1010, a controller 1020, and a storage unit 1030, and the receiver 1040 may include a transceiver 1050 and a controller 1060. Here, the storage unit of the transmitter may store ($\widetilde{\varphi_{l,0}}$, $\widetilde{\varphi_{l,1}}$) tables listing frequency selective phase rotation values pre-calculated based on the transmit correlation according to the second method proposed in the present invention. The controller may estimate the transmit correlation based on uplink feedback information, SRS, reference signal received by the transceiver, calculate ($\widetilde{\varphi_{l,0}}$, $\widetilde{\varphi_{l,1}}$) values maximizing the reception SNR based on the estimated transmit correlation according to the first method proposed in the present invention. Afterward, it may be possible to control the transceiver to transmit a signal by applying the ($\widetilde{\varphi_{l,0}}$, $\widetilde{\varphi_{l,1}}$) value calculated per resource block. It may also be possible to control the transceiver to transmit the signal by applying the ($\widetilde{\varphi_{l,0}}$, $\widetilde{\varphi_{l,1}}$) value pre-configured based on the calculated transmit correlation according to the second method. The transceiver may map the signal to which the ($\widetilde{\varphi_{l,0}}$, $\widetilde{\varphi_{l,1}}$) value determined per resource block in a frequency-selective manner to the antenna and transmits the mapped signal. The transceiver may transmit the SRS to the terminal and the signal to the terminal according to a predetermined ($\widetilde{\varphi_{l,0}}$, $\widetilde{\varphi_{l,1}}$) pair and receive uplink feedback information from the terminal. The transceiver may include the function blocks of FIGS. 5 and 6, or the controller may perform corresponding functions.

The transceiver of the transmitter may receive various signals transmitted by the base station and transmit uplink feedback information to the base station. The controller of the receiver may receive and decode a phase-rotated signal based on the reference signal transmitted by the base station.

The invention claimed is:

1. A signal transmission method performed by a transmitter, the method comprising:
   estimating a transmit correlation between transmission paths;
   determining phase rotation values to be applied to a transmission signal from a plurality of predetermined phase rotation values stored in the transmitter based on the estimated transmit correlation;
   applying phase rotation to the transmission signal based on the phase rotation values, wherein the phase rotation values are determined by an equation:

$$(\widetilde{\varphi_{l,0}}, \widetilde{\varphi_{l,1}}) = \arg\max_{(\varphi_{l,0}, \varphi_{l,1})} \sum_{k \in \{subcarrier\ index\}} \left(1 + |\alpha|\cos\left(\frac{\varphi_{l,0} + \varphi_{l,1}}{2}k - \varphi_\alpha\right)\cos\left(\frac{\varphi_{l,0} + \varphi_{l,1}}{2}k\right)\right),$$

where $\tilde{\varphi}_{l,0}$ and $\tilde{\varphi}_{l,1}$ denote the phase rotation values, a denotes the transmit correlation, $\varphi_\alpha$ denotes a phase angle of α, and l denotes an index of a small unit constituting a frequency band; and
transmitting the transmission signal.

2. The method of claim 1, wherein the phase rotation values are determined by the small unit constituting the frequency band based on channel state.

3. The method of claim 1, further comprising receiving, in case that a time division duplex (TDD) system is applied, a sounding reference signal (SRS), wherein the phase rotation values are determined based on channel state information estimated based on the SRS.

4. The method of claim 1, further comprising receiving, in case that a frequency division duplex (FDD) system is applied, channel state information transmitted by a receiver, wherein the phase rotation values are determined based on the channel state information.

5. The method of claim 4, further comprising transmitting a reference signal (RS) to which one of predetermined phase rotation values pair sets is applied to the receiver, wherein the channel state information is estimated based on the RS.

6. The method of claim 1, wherein the phase rotation values are determined according to a phase rotation values set predetermined based on the estimated transmit correlation.

7. The method of claim 1, further comprising determining phase rotation values based on a table, wherein the table stores a first pair of predetermined phase rotation values of a plurality of predetermined phase rotation values associated with a first transmit correlation, and
wherein the table stores a second pair of predetermined phase rotation values of the plurality of predetermined phase rotation values associated with a second transmit correlation.

8. A transmitter for transmitting a signal, the transmitter comprising:
   a transceiver configured to transmit and receive signals to and from a receiver; and
   a controller configured to control to:
     estimate a transmit correlation between transmission paths,
     determine phase rotation values to be applied to a transmission signal from a plurality of predetermined phase rotation values stored in the transmitter based on the estimated transmit correlation,
     apply phase rotation to the transmission signal based on the phase rotation values, wherein the phase rotation values are determined by an equation:

$$(\tilde{\varphi}_{l,0}, \tilde{\varphi}_{l,1}) = \arg\max_{(\varphi_{l,0}, \varphi_{l,1})} \sum_{k \in \{subcarrier\ index\}} \left(1 + |\alpha|\cos\left(\frac{\varphi_{l,0} + \varphi_{l,1}}{2}k - \varphi_\alpha\right)\cos\left(\frac{\varphi_{l,0} + \varphi_{l,1}}{2}k\right)\right),$$

where $\tilde{\varphi}_{l,0}$ and $\tilde{\varphi}_{l,1}$ denote the phase rotation values, α denotes the transmit correlation, $\varphi_\alpha$ denotes a phase angle of α, and l denotes an index of a small unit constituting a frequency band, and
transmit the transmission signal.

9. The transmitter of claim 8, wherein the phase rotation values are determined by the small unit constituting the frequency band based on channel state.

10. The transmitter of claim 9,
    wherein the controller is further configured to control to transmit a reference signal (RS) to which one of predetermined phase rotation values pair sets is applied to the receiver, and
    wherein channel state information is estimated based on the RS.

11. The transmitter of claim 8,
    wherein the controller is further configured to control to receive, in case that a time division duplex (TDD) system is applied, a sounding reference signal (SRS), and
    wherein the phase rotation values are determined based on channel state information estimated based on the SRS.

12. The transmitter of claim 8,
    wherein the controller is further configured to control to receive, in case that a frequency division duplex (FDD) system is applied, channel state information transmitted by a receiver, and
    wherein the phase rotation values are determined based on the channel state information.

13. The transmitter of claim 8, wherein the phase rotation values are determined according to a phase rotation values set predetermined based on the estimated transmit correlation.

14. The transmitter of claim 8,
    wherein the controller is further configured to determine phase rotation value based on a table,
    wherein the table stores a first pair of predetermined phase rotation values of a plurality of predetermined phase rotation values associated with a first transmit correlation, and wherein the table stores a second pair of predetermined phase rotation values of the plurality of predetermined phase rotation values associated with a second transmit correlation.

\* \* \* \* \*